(12) United States Patent
Naitoh et al.

(10) Patent No.: US 10,486,598 B2
(45) Date of Patent: Nov. 26, 2019

(54) VEHICULAR IMAGE-DISPLAY SYSTEM (71) Applicants: Takuroh Naitoh, Kanagawa (JP); Kenji Shiraishi, Kanagawa (JP); Kenji Kagami, Kanagawa (JP); Tomonori Kimura, Kanagawa (JP); Kenji Nozaki, Kanagawa (JP); Yasuhiro Nomura, Kanagawa (JP); Hiromitsu Shimizu, Kanagawa (JP)

(72) Inventors: Takuroh Naitoh, Kanagawa (JP); Kenji Shiraishi, Kanagawa (JP); Kenji Kagami, Kanagawa (JP); Tomonori Kimura, Kanagawa (JP); Kenji Nozaki, Kanagawa (JP); Yasuhiro Nomura, Kanagawa (JP); Hiromitsu Shimizu, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 27 days.

(21) Appl. No.: 15/486,332

(22) Filed: Apr. 13, 2017

(65) Prior Publication Data
US 2017/0217373 A1 Aug. 3, 2017

Related U.S. Application Data (63) Continuation of application No. PCT/JP2015/079377, filed on Oct. 16, 2015.

(30) Foreign Application Priority Data

Oct. 17, 2014 (JP) .................................. 2014-212828

(51) Int. Cl.
B60R 1/00 (2006.01)
G06F 3/01 (2006.01)
(Continued)

(52) U.S. Cl.
CPC .............. *B60R 1/006* (2013.01); *G06F 3/013* (2013.01); *G06K 9/00845* (2013.01); *G06T 3/40* (2013.01);
(Continued)

(58) Field of Classification Search
None
See application file for complete search history.

(56) References Cited

U.S. PATENT DOCUMENTS 7,372,486 B2  5/2008  Shinohara et al.
8,045,035 B2  10/2011  Shiraishi
(Continued)

FOREIGN PATENT DOCUMENTS

DE  102012025322 A1 *  6/2014  .............. B60R 1/00
EP  2 045 133 A2  4/2009
(Continued)

OTHER PUBLICATIONS

Extended European Search Report dated Oct. 2, 2017 in Patent Application No. 15850653.5.
(Continued)

*Primary Examiner* — James M Anderson, II
(74) *Attorney, Agent, or Firm* — Oblon, McClelland, Maier & Neustadt, L.L.P.

(57) ABSTRACT

A vehicular image-display system includes an image capturing device, a control device, and an image display device. The image capturing device includes an imaging element configured to capture an image of surroundings of a vehicle, and an image acquirer configured to acquire, based on the captured image captured by the imaging element, an image that is smaller in area than the captured image. The control device includes an image generator configured to generate an image that is smaller in area than the acquired image based on the acquired image acquired by the image acquirer.

(Continued)

The image display device is configured to display the image to be displayed generated by the image generator. The acquired image is transmitted from the image capturing device to the control device.

8 Claims, 8 Drawing Sheets

(51) Int. Cl.
| | |
|---|---|
| *G06K 9/00* | (2006.01) |
| *G06T 3/40* | (2006.01) |
| *H04N 5/232* | (2006.01) |
| *H04N 7/18* | (2006.01) |
| *B60R 1/04* | (2006.01) |

(52) U.S. Cl.
CPC ......... *H04N 5/23293* (2013.01); *H04N 7/183* (2013.01); *B60R 1/04* (2013.01)

(56) References Cited

U.S. PATENT DOCUMENTS

| | | | |
|---|---|---|---|
| 8,269,852 B2 | 9/2012 | Shiraishi et al. | |
| 8,503,827 B2 | 8/2013 | Noh et al. | |
| 8,736,680 B1* | 5/2014 | Cilia | H04N 5/247 |
| | | | 348/148 |
| 8,931,111 B2 | 1/2015 | Kimura | |
| 2001/0012410 A1 | 8/2001 | Michiie et al. | |
| 2002/0040415 A1 | 4/2002 | Moteki et al. | |
| 2003/0011821 A1 | 1/2003 | Obata et al. | |
| 2003/0132942 A1 | 7/2003 | Obata et al. | |
| 2003/0146988 A1 | 8/2003 | Shiraishi | |
| 2003/0147000 A1 | 8/2003 | Shiraishi | |
| 2003/0169346 A1 | 9/2003 | Ojima et al. | |
| 2004/0091254 A1 | 5/2004 | Shiraishi | |
| 2004/0125415 A1 | 7/2004 | Michiie et al. | |
| 2004/0130632 A1 | 7/2004 | Shiraishi | |
| 2004/0252224 A1 | 12/2004 | Shiraishi et al. | |
| 2004/0263633 A1 | 12/2004 | Shinohara et al. | |
| 2005/0062854 A1 | 3/2005 | Shiraishi | |
| 2005/0134700 A1 | 6/2005 | Shiraishi | |
| 2005/0151874 A1 | 7/2005 | Shiraishi | |
| 2005/0168620 A1 | 8/2005 | Shiraishi | |
| 2005/0200915 A1 | 9/2005 | Michiie et al. | |
| 2005/0231764 A1 | 10/2005 | Michiie et al. | |
| 2005/0275892 A1 | 12/2005 | Obata et al. | |
| 2006/0050315 A1 | 3/2006 | Obata et al. | |
| 2006/0050994 A1 | 3/2006 | Michiie et al. | |
| 2006/0059281 A1 | 3/2006 | Michiie et al. | |
| 2007/0024923 A1 | 2/2007 | Shimizu | |
| 2007/0216951 A1 | 9/2007 | Shiraishi | |
| 2007/0263933 A1 | 11/2007 | Ojima et al. | |
| 2007/0268370 A1 | 11/2007 | Sanno et al. | |
| 2008/0036901 A1 | 2/2008 | Shinohara et al. | |
| 2008/0049287 A1 | 2/2008 | Kimura et al. | |
| 2008/0225070 A1 | 9/2008 | Morishita et al. | |
| 2009/0015709 A1 | 1/2009 | Kimura et al. | |
| 2009/0047010 A1 | 2/2009 | Yoshida et al. | |
| 2009/0073282 A1 | 3/2009 | Yamada et al. | |
| 2009/0079553 A1 | 3/2009 | Yanagi et al. | |
| 2009/0115869 A1 | 5/2009 | Ojima et al. | |
| 2009/0141152 A1 | 6/2009 | Ojima et al. | |
| 2009/0180000 A1 | 7/2009 | Shiraishi | |
| 2009/0316164 A1 | 12/2009 | Takahashi et al. | |
| 2009/0323137 A1 | 12/2009 | Kimura | |
| 2010/0045814 A1 | 2/2010 | Shiraishi | |
| 2010/0171842 A1 | 7/2010 | Shiraishi | |
| 2010/0225693 A1 | 9/2010 | Sakurada et al. | |
| 2010/0231632 A1 | 9/2010 | Kobayashi et al. | |
| 2010/0302410 A1 | 12/2010 | Naito | |
| 2010/0322611 A1 | 12/2010 | Yoshida et al. | |
| 2011/0007112 A1 | 1/2011 | Takei et al. | |
| 2011/0109789 A1 | 5/2011 | Himuro et al. | |
| 2011/0122184 A1 | 5/2011 | Kimura et al. | |
| 2011/0205275 A1 | 8/2011 | Kimura et al. | |
| 2012/0050585 A1 | 3/2012 | Shiraishi | |
| 2012/0154591 A1 | 6/2012 | Baur et al. | |
| 2012/0287486 A1 | 11/2012 | Kitayama et al. | |
| 2013/0155185 A1 | 6/2013 | Nishida | |
| 2014/0118565 A1 | 5/2014 | Himuro et al. | |
| 2015/0070576 A1 | 3/2015 | Himuro et al. | |
| 2015/0194128 A1* | 7/2015 | Hicok | G09G 5/12 |
| | | | 345/428 |
| 2015/0201168 A1 | 7/2015 | Naitoh et al. | |
| 2015/0251602 A1* | 9/2015 | Baur | B60R 1/00 |
| | | | 348/148 |
| 2016/0006911 A1 | 1/2016 | Kimura et al. | |

FOREIGN PATENT DOCUMENTS

| | | |
|---|---|---|
| EP | 2 154 899 A2 | 2/2010 |
| JP | 2003-111050 A | 4/2003 |
| JP | 2005-303792 | 10/2005 |
| JP | 2007-081590 | 3/2007 |
| JP | 2007-282123 | 10/2007 |
| JP | 2009-6893 | 1/2009 |
| JP | 2010-163104 | 7/2010 |
| JP | 4941760 | 3/2012 |
| JP | 2014-119279 | 6/2014 |
| WO | WO 2011/028686 A1 | 3/2011 |

OTHER PUBLICATIONS

International Search Report dated Dec. 15, 2015 in PCT/JP2015/079377 filed on Oct. 16, 2015 (with English translation).
Written Opinion dated Dec. 15, 2015 in PCT/JP2015/079377 filed on Oct. 16, 2015.
Korean Notice of Allowance of Patent dated Mar. 26, 2019 filed in Korean Application No. 10-2017-7009496 with English Translation, citing documents AO-AP, therein, 7 pages.

* cited by examiner

VEHICULAR IMAGE-DISPLAY SYSTEM

CROSS-REFERENCE TO RELATED APPLICATIONS

The present application is a continuation application of International Application No. PCT/JP2015/079377, filed Oct. 16, 2015, which claims priority to Japanese Patent Application No. 2014-212828, filed Oct. 17, 2014. The contents of these applications are incorporated herein by reference in their entirety.

BACKGROUND OF THE INVENTION

1. Field of the Invention

The present invention relates to a vehicular image-display system.

2. Description of the Related Art

Vehicle-mounted cameras are increasingly widespread with widespread of drive recorders and around-vehicle monitoring cameras.

Meanwhile, although electronic mirrors that differ from side-view mirrors and rear-view mirrors are being developed, due to high technical obstacles to be overcome in terms of safety, reliability, and performance, electronic mirrors have not gained widespread use yet.

What is required of an electronic mirror is to continue supplying images around a vehicle stably. To achieve this, a system including from a camera to a display is required to perform processing at a high resolution (high pixel density), high contrast, high frame rate, and high speed.

A technique that, even though a captured image is used, enables more quick and intuitive awareness of an object to be noticed in the surroundings of own vehicle is known from, for example, Japanese Patent No. 4941760.

SUMMARY OF THE INVENTION

According to one aspect of the present invention, a vehicular image-display system includes an image capturing device, a control device, and an image display device. The image capturing device includes an imaging element configured to capture an image of surroundings of a vehicle, and an image acquirer configured to acquire, based on the captured image captured by the imaging element, an image that is smaller in area than the captured image. The control device includes an image generator configured to generate an image that is smaller in area than the acquired image based on the acquired image acquired by the image acquirer. The image display device is configured to display the image to be displayed generated by the image generator. The acquired image is transmitted from the image capturing device to the control device.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

Figure 1:
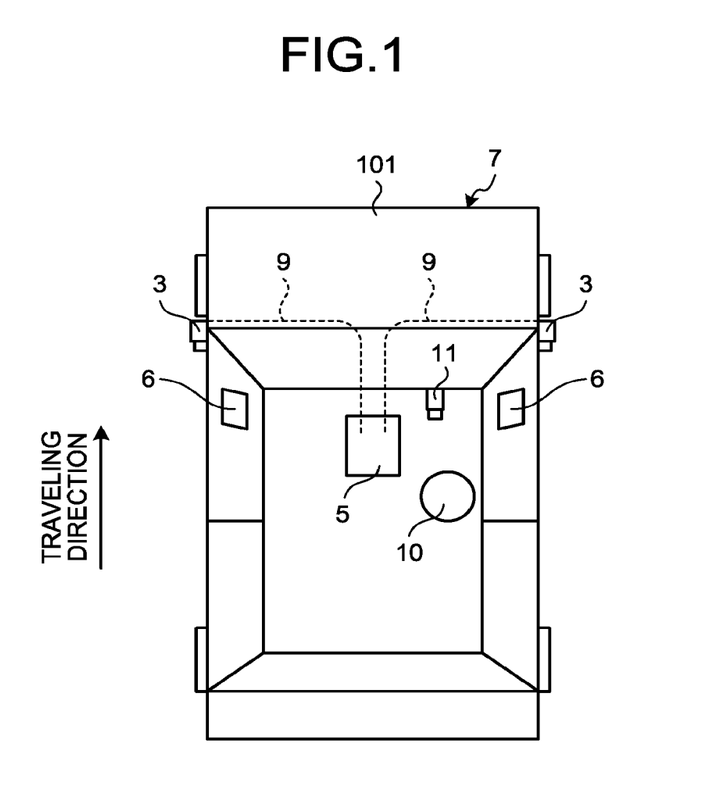
FIG. 1 is an overall architecture diagram of a vehicular image-display system according to an embodiment.

FIG. 1 is an overall architecture diagram of a vehicular image-display system 7 according to an embodiment of the present invention. The vehicular image-display system 7 is installed in a vehicle 101. The vehicular image-display system 7 includes an image capturing device 3 that captures an image of surroundings of the own vehicle and acquires an image of a necessary area from the thus-captured image, a control device 5 to which the acquired image acquired by the image capturing device 3 is to be transmitted from the image capturing device 3 via an acquired-image transmission part 9, and an image display device 6 attached to the vehicle 101 to display a display image generated by the control device 5.

An in-vehicle camera 11 is attached to inside of the vehicle 101 and continuously captures an image of the face of a driver 10. The image capturing device 3 analyzes information about line-of-sight position of the driver 10 based on image data captured by the in-vehicle camera 11 and acquires, from the captured image, an image that is smaller in area than the captured image based on a result of the analysis.

Figure 2:
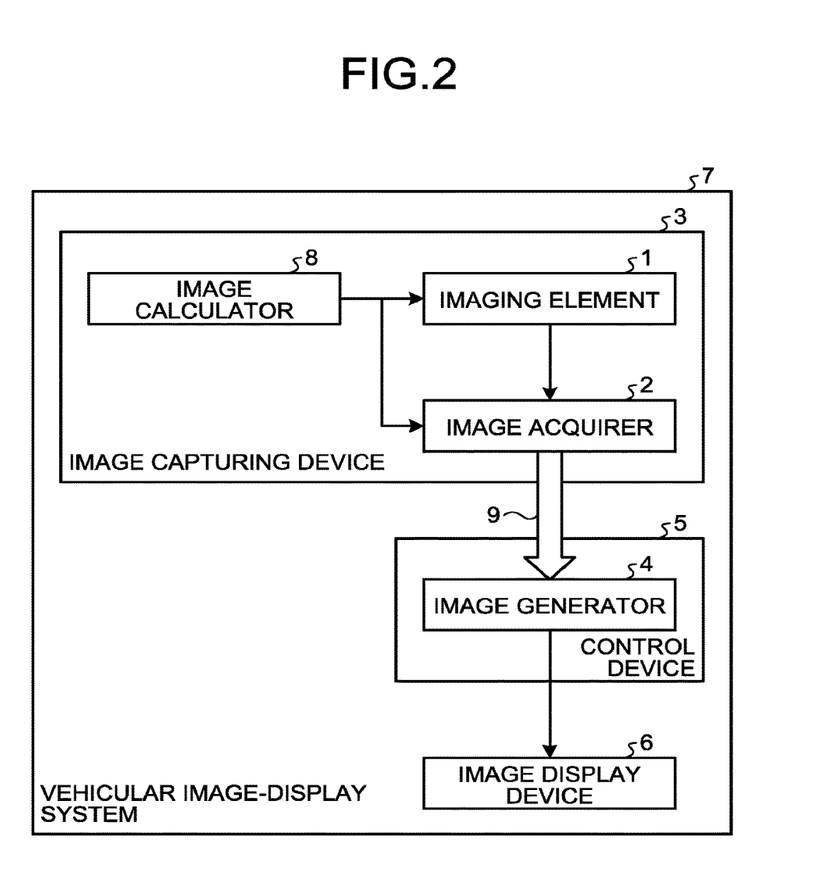
FIG. 2 is a system architecture diagram of the vehicular image-display system according to the embodiment.

FIG. 2 is a system architecture diagram of the vehicular image-display system 7 of the present embodiment.

The image capturing device 3 includes an imaging element 1 that captures an image of the surroundings of the own vehicle, an image calculator 8 that calculates an image of a necessary area from the captured image captured by the imaging element 1, and an image acquirer 2 that acquires an image of the area calculated by the image calculator 8.

The image calculator 8 analyzes information about line-of-sight position of the driver 10 from image data captured by the in-vehicle camera 11, calculates position and area of a required image based on a result of the analysis, and transmits information about the position and area to the imaging element 1 and the image acquirer 2.

The imaging element 1 captures a rear-view image of the vehicle and transmits thus-captured image data to the image acquirer 2.

The imaging element 1 captures an image of only a partial image region of an entire capturable image region based on the information about the required image position and area received from the image calculator 8 and transmits the image to the image acquirer 2. It is preferable that the partial image region to be captured by the imaging element 1 covers across the entire capturable image region in the horizontal direction but covers only a partial image region of the entire capturable image region in the vertical direction.

The image acquirer 2 performs trimming on the captured image received from the imaging element 1 in accordance with the information about the position and area of the required acquired image received from the image calculator 8, thereby acquiring an image that is smaller in area than the captured image. Hence, only the image of the required position and area is transmitted via the acquired-image transmission part 9 to the control device 5. At this time, the "information about the position and area" calculated by the image calculator 8 is transmitted via the acquired-image transmission part 9 to the control device 5 together with the image.

The control device 5 includes an image generator 4 that generates, based on the acquired image transmitted from the image capturing device 3, a display image to be displayed on the image display device 6 in accordance with the information about the required position and area of the acquired image received from the image calculator 8.

In the vehicular image-display system 7 according to the present embodiment, because only the acquired image, which is a part of the entire area of the captured image captured by the image capturing device 3, of the required position and area, which are received from the image calculator 8, is transmitted to the control device 5, volume of image data to be transmitted can be reduced. Accordingly, image processing load can be reduced, and the surroundings of the own vehicle can be displayed quickly.

Figure 3:
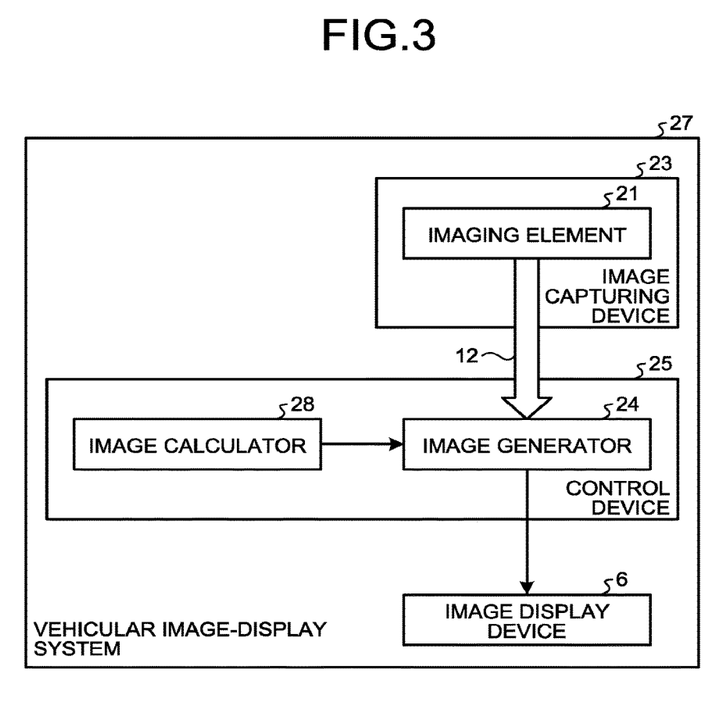
FIG. 3 is a system architecture diagram of a vehicular image-display system as a reference comparative example for the vehicular image-display system according to the embodiment.

FIG. 3 is a system architecture diagram of a vehicular image-display system 27 as a reference comparative example for describing an advantage of the present embodiment having the configuration illustrated in FIG. 2.

In the vehicular image-display system 27, an image capturing device 23 includes an imaging element 21 that captures surroundings of own vehicle. Image data representing a captured image captured by the image capturing device 23 of an entire capturable image area is transmitted via an image transmission part 12 to a control device 25.

The control device 25 includes an image calculator 28 and an image generator 24. The image calculator 28 analyzes information about line-of-sight position of the driver 10 from image data captured by the in-vehicle camera 11, calculates a required image position and area based on a result of the analysis, and transmits the position and area to the image generator 24.

The image generator 24 generates, based on the image data of the entire area transmitted from the image capturing device 23, an image to be displayed on the image display device 6 using information about the required position and area calculated by the image calculator 28.

In the reference comparative example illustrated in FIG. 3, image trimming or, more specifically, processing of acquiring the image that is smaller in area than the captured image, is performed by the image generator 24 on the side of the control device 25. Accordingly, the image data captured by the imaging element 21, inclusive of image data that is not to be used for display on the image display device 6, is to be transmitted using the image transmission part 12 from the image capturing device 23 to the control device 25.

By contrast, in the present embodiment, processing of acquiring an image that is smaller in area than a captured image is performed by the image acquirer 2 on the side of the image capturing device 3, by which image data representing the acquired image of only a position and area required by the image generator 4 is obtained. Accordingly, image data transmitted via the acquired-image transmission part 9 from the image capturing device 3 to the control device 5 can be minimized.

A camera used in a general vehicle typically uses, as an image-data transmission part, a long harness that is several meters long. Because noise originating from the image-data transmission part can matter considerably, reducing volume of image data transmitted via the image-data transmission part can lead to considerable effectiveness. Furthermore, in the reference comparative example of FIG. 3, image data of the entire area captured by the image capturing device 23 is transmitted via the image transmission part 12 to the control device 25. Accordingly, transmission load for an image region that is not to be displayed is wasted for no use, which inhibits quick display of the surroundings of the own vehicle.

Figure 4:
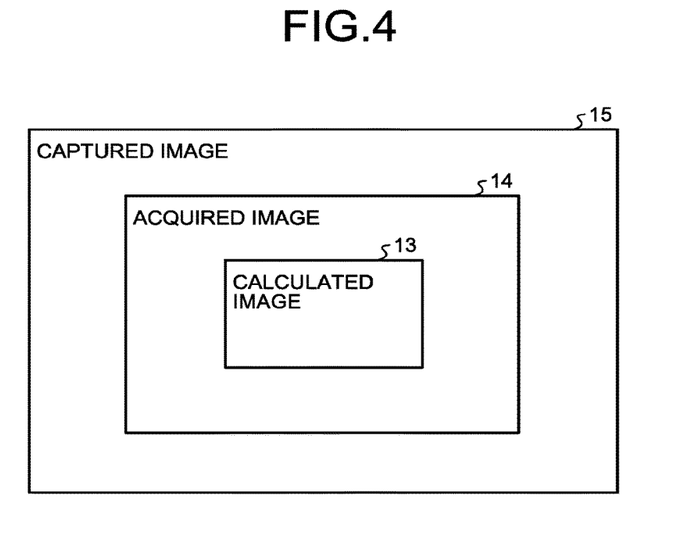
FIG. 4 is a diagram illustrating areas of images used in the vehicular image-display system according to the embodiment.

FIG. 4 is a diagram illustrating areas of images used in the vehicular image-display system 7 of the present embodiment.

A captured image 15 is an image captured by the imaging element 1 included in the image capturing device 3.

An acquired image 14 is an image of an area calculated by the image calculator 8 included in the image capturing device 3 acquired by the image acquirer 2.

A calculated image 13 is an image position and area to be displayed on a display unit calculated by the image calculator 8.

The image generator 4 included in the control device 5 generates, as a display image to be displayed on the image display device 6, an image position and area corresponding to the calculated image 13 based on the acquired image 14.

The acquired image 14 is an image that is smaller in area than the captured image 15 and equal to or larger in area than the calculated image 13 calculated by the image calculator 8. The calculated image 13 is equal to or smaller in area than the acquired image 14.

Because the acquired image 14 is smaller in area than the captured image 15 of the entire area, the acquired image 14 can achieve data volume reduction as compared with the captured image 15. Accordingly, transmission load for transmitting the acquired image 14 to the control device 5 can be reduced.

Because the acquired image 14 is equal to or larger in area than the calculated image 13 that is to be actually displayed, when determining an appropriate display area of a display image to be displayed on the image display device 6, the image generator 4 can select the display area from an area having a certain extent. As a result, the need for re-capturing an image using the image capturing device 3 can be obviated.

Figure 5:
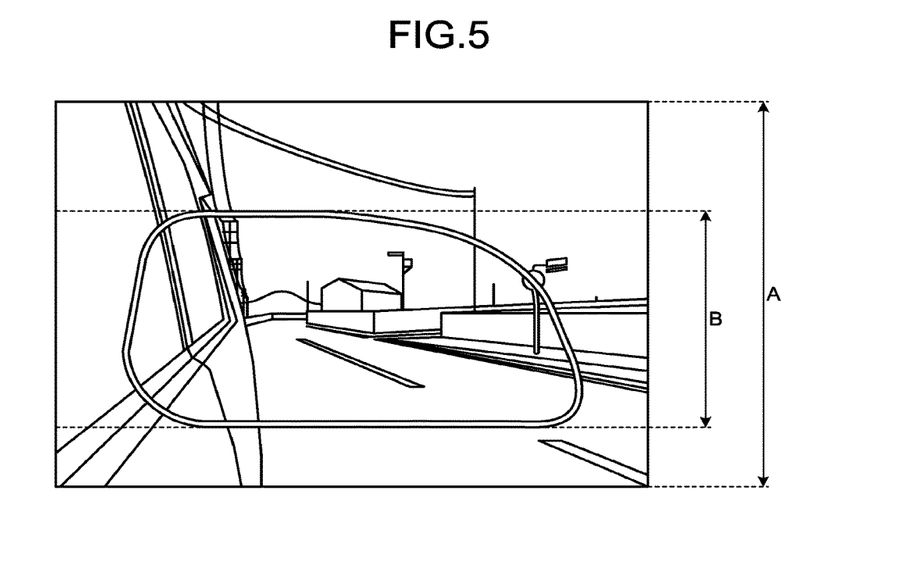
FIG. 5 is a diagram illustrating a captured-image-and-mirror relationship in the vehicular image-display system according to the embodiment.

FIG. 5 is a diagram illustrating a captured-image-and-mirror relationship. When the captured image 15 captured by the image capturing device 3 is used in place of a mirror, as illustrated in FIG. 5, an area A defined by and with reference to a vertical position of the captured image 15 is larger than an area B defined by and with reference to a vertical position of an image in the otherwise-used mirror.

Figure 6:
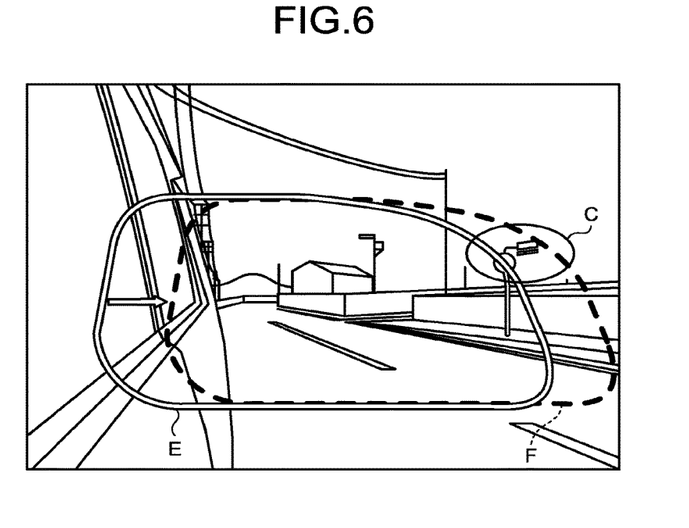
FIG. 6 is a diagram describing an example of an image position and area that are responsive to motion of a driver in the vehicular image-display system according to the embodiment.
Figure 7:
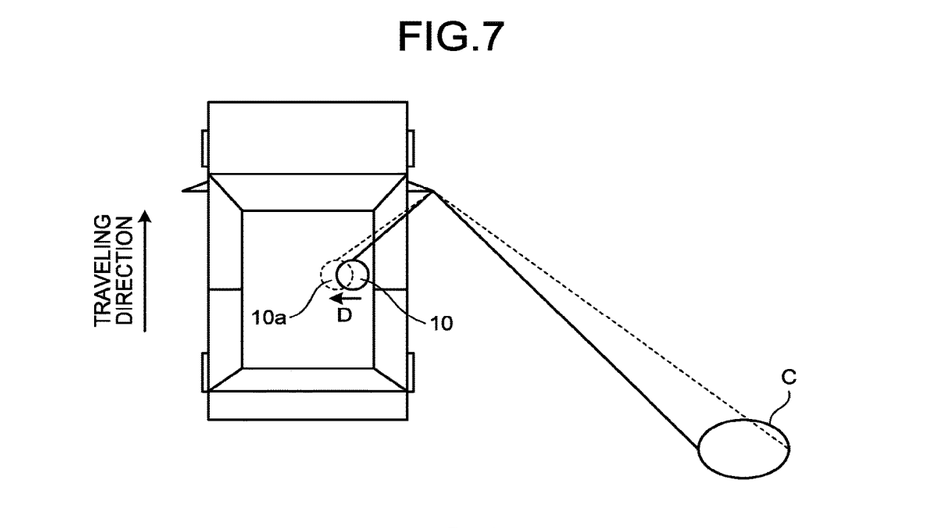
FIG. 7 is a diagram describing the example of the image position and area that are responsive to the motion of the driver in the vehicular image-display system according to the embodiment.

FIG. 6 and FIG. 7 are diagrams describing an example of an image position and area that are responsive to motion of a driver in the vehicular image-display system 7 of the present embodiment. When the driver 10 desires to see a subject indicated at a position C in FIG. 6 and FIG. 7, the driver 10 typically takes an action D of shifting his/her line-of-sight position as does a driver 10a as an action of seeing rearward using the mirror. Accordingly, there will arise a desire to see the subject indicated at the position C in FIG. 6 and FIG. 7 by taking the action D even when the captured image 15 captured by the image capturing device 3 is used in place of the mirror.

When the captured image 15 captured by the image capturing device 3 is used in place of the mirror, if an image of a position and a large area, such as the area A defined by and with reference to the vertical position of the image of FIG. 5, is displayed on the image display device 6, unnecessary information having adverse effect on safe driving can be given to the driver 10. Accordingly, an image of an area E defined by and with reference to the position of the image of FIG. 6 is preferably displayed on the image display device 6 when line of sight extends from the position of the driver 10, while an image of an area F defined by and with reference to the position of the image of FIG. 6 is preferably displayed on the image display device 6 when line of sight extends from the position of the driver 10a.

When line of sight extends from the position of the driver 10, the image calculator 8 analyzes information about the line-of-sight position of the driver 10 based on image data captured by the in-vehicle camera 11 and calculates, as a required image area, the area E based on a result of the analysis. The image acquirer 2 acquires the acquired image 14 containing the calculated area E from the captured image 15. The image generator 4 generates a display image of the area E as an image to be displayed on the image display device 6 based on the acquired image 14 and area information indicating the area E. Thus, when the line of sight extends from the position of the driver 10, the image of the area E is displayed on the image display device 6.

Thereafter, when the driver 10 shifts the line-of-sight position as does the driver 10a, the image calculator 8 analyzes information about the line-of-sight position of the driver 10 based on image data captured by the in-vehicle camera 11 and calculates, as a required image area, the area F based on a result of the analysis. The image acquirer 2 acquires the acquired image 14 containing the calculated area F from the captured image 15. The image generator 4 generates a display image of the area F as an image to be displayed on the image display device 6 based on the acquired image 14 and area information indicating the area F. Thus, when the driver 10 shifts the line-of-sight position to the position of the driver 10a, the image of the area F is displayed on the image display device 6.

Figure 8:
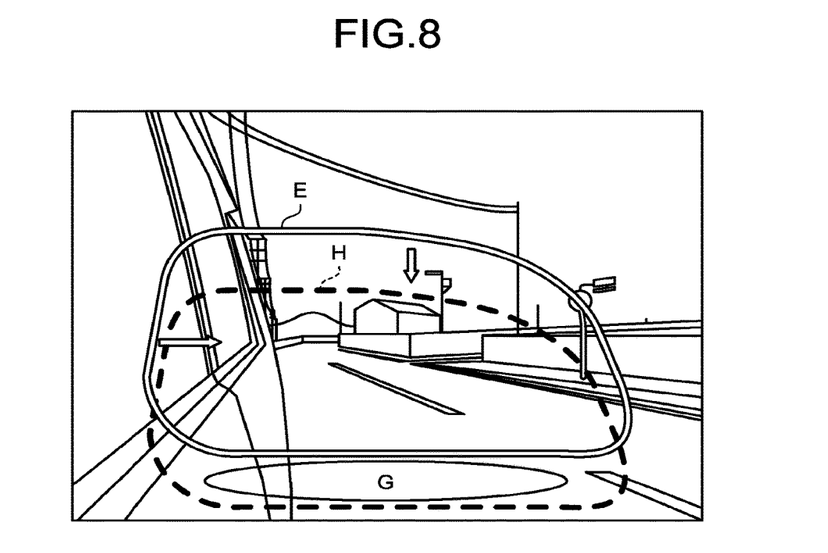
FIG. 8 is a diagram describing another example of an image position and area that are responsive to motion of the driver in the vehicular image-display system according to the embodiment.
Figure 9:
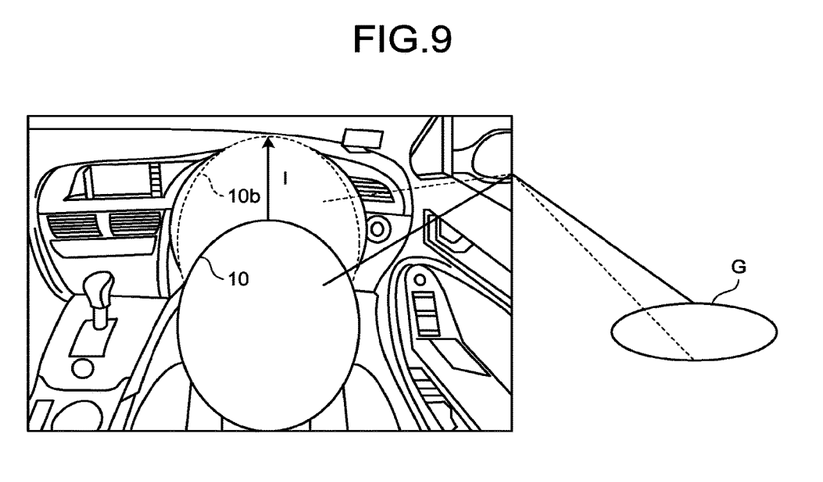
FIG. 9 is a diagram describing the other example of the image position and area that are responsive to the motion of the driver in the vehicular image-display system according to the embodiment.

FIG. 8 and FIG. 9 are diagrams describing another example of an image position and area that are responsive to motion of the driver in the vehicular image-display system 7 of the present embodiment. When the driver 10 desires to see a subject indicated at a position G in FIG. 8 and FIG. 9, the driver 10 typically takes an action I of shifting his/her line-of-sight position as does a driver 10b as an action of seeing rearward using the mirror. Accordingly, there will arise a desire to see the subject indicated at the position G in FIG. 8 and FIG. 9 by taking the action I even when the captured image 15 captured by the image capturing device 3 is used in place of the mirror.

In this case, an image of the area E defined by and with reference to the position of the image of FIG. 8 is preferably displayed on the image display device 6 when the line of sight extends from the position of the driver 10, while an image of an area H defined by and with reference to the position of the image of FIG. 8 is preferably displayed on the image display device 6 when the line of sight extends from the position of the driver 10b. According to the vehicular image-display system 7 of the present embodiment, it is possible to cause the image of the area E to be displayed on the image display device 6 when line of sight extends from the position of the driver 10 but, when the driver 10 shifts his/her line-of-sight position to the position of the driver 10b, cause the image of the area H to be displayed on the image display device 6.

Figure 10:
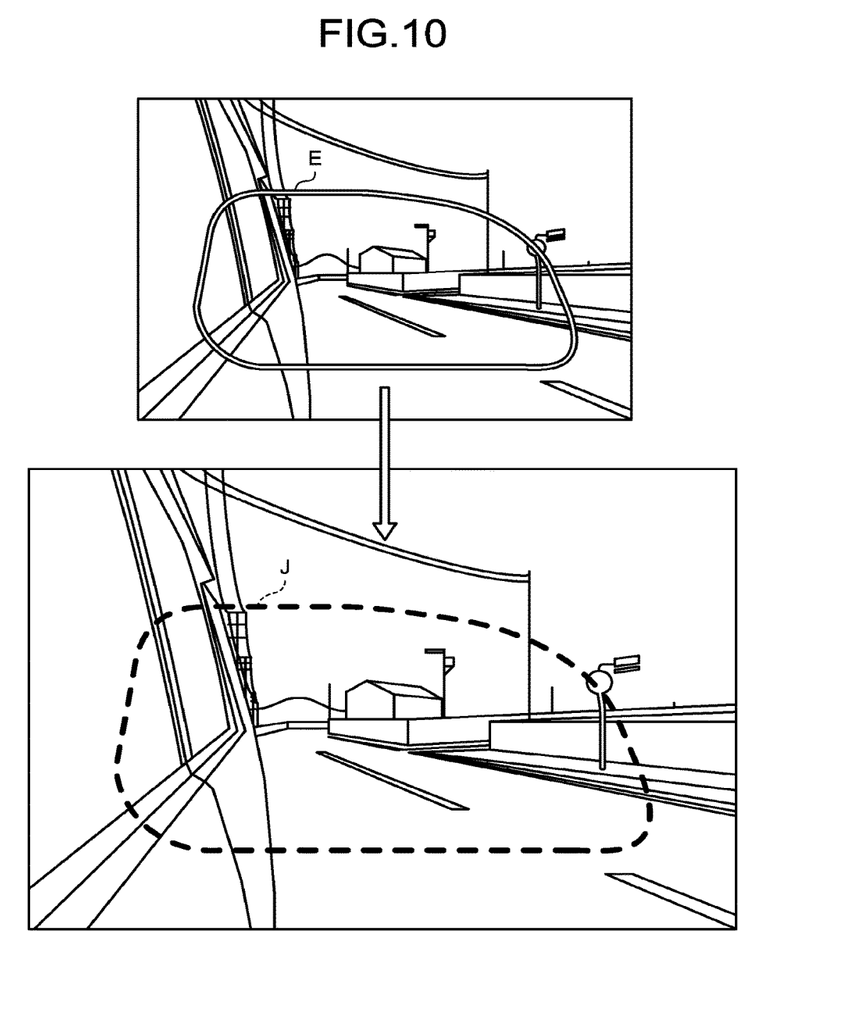
FIG. 10 is a diagram describing still another example of an image position and area that are responsive to motion of the driver in the vehicular image-display system according to the embodiment.
Figure 11:
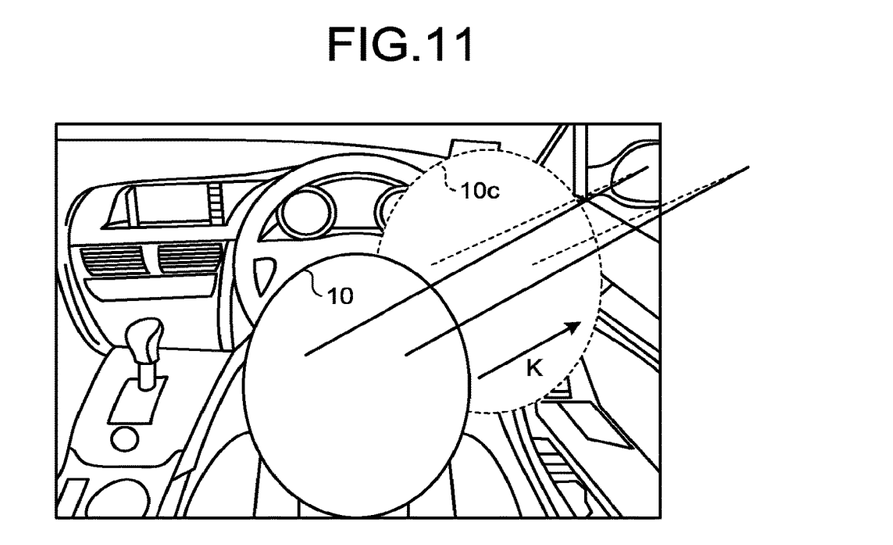
FIG. 11 is a diagram describing the still other example of the image position and area that are responsive to the motion of the driver in the vehicular image-display system according to the embodiment.

FIG. 10 and FIG. 11 are diagrams describing still another example of an image position and area that are responsive to motion of the driver in the vehicular image-display system 7 of the present embodiment. When the driver 10 desires to see the mirror indicated by the area E of FIG. 10 from a closer position, the driver 10 illustrated in FIG. 11 typically takes an action K of shifting his/her line-of-sight position as does a driver 10c. Accordingly, there will arise a desire to see the mirror in a close-up manner by taking the action K even when the captured image 15 captured by the image capturing device 3 is used in place of the mirror.

In this case, an image of the area E defined by and with reference to the position of the image of FIG. 10 is preferably displayed on the image display device 6 when line of sight extends from the position of the driver 10, while an image of an area J defined by and with reference to the position of the image of FIG. 10 is preferably displayed on the image display device 6 when line of sight extends from the position of the driver 10c. According to the vehicular image-display system 7 of the present embodiment, it is possible to cause the image of the area E to be displayed on the image display device 6 when line of sight extends from the position of the driver 10 but, when the driver 10 shifts his/her line-of-sight position to the position of the driver 10c, cause the image of the area J to be displayed on the image display device 6.

It will be important that the position and area of an image to be displayed on the image display device 6 are changed depending on line-of-sight position of a driver in this manner when the captured image 15 captured by the image capturing device 3 is used in place of a mirror.

According to an embodiment, it is possible to reduce transmission volume.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A vehicular image-display system, comprising:
   an image display device in which a driver of a vehicle views the image display device in a viewing direction;
   an image capturing device including
      a camera configured to capture a first image of surroundings of the vehicle, and
      first processing circuitry configured to (1) calculate a required image position and an image region within the first image, and determine a second image by processing the captured first image based on the calculated image position and image region, the second image being smaller in area than the captured first image, the second image being of an area of the captured first image viewed in a reflection of the viewing direction from a surface of the image display device, and (2) transmit the second image to second processing circuitry, wherein the second processing circuitry is located remote from the image capturing device within the vehicle; and
   the second processing circuitry configured to receive the second image and generate a third image that is smaller in area than the received second image, based on the received second image, wherein
   the image display device is further configured to display the third image.

2. The vehicular image-display system according to claim 1, wherein the first processing circuitry is further configured to
   analyze a line-of-sight position of the driver of the vehicle, the line-of-sight position being a position in the reflection of the viewing direction as measured from the image display device, and
   calculate the image position and the image region based on a result of the analysis of the line-of-sight position.

3. The vehicular image-display system according to claim 1, wherein the camera is provided to the vehicle.

4. The vehicular image-display system of claim 1, wherein the first processing circuitry is further configured to transmit the second image along with the calculated image position and image region to the second processing circuitry.

5. The vehicular image-display system of claim 2, further comprising an in-vehicle camera to capture image data of the driver,
   wherein the first processing circuitry is further configured to analyze the line-of-sight position using the captured image data captured by the in-vehicle camera.

6. The vehicular image-display system of claim 1, wherein the camera is configured to capture the first image, which is only of a partial region of a field of view of the camera, the partial region being determined based on the calculated image position and image region.

7. The vehicular image-display system according to claim 4, wherein the second processing circuitry is further configured to calculate an image location and an area of the third image within the second image based on the calculated image position and image region transmitted to the second processing circuitry from the first processing circuitry.

8. The vehicular image-display system according to claim 7, wherein the second processing circuitry is further configured to calculate the image location and the area of the third image so that the third image falls within the area of the second image.

* * * * *